US 11,379,371 B2

(12) United States Patent
Jeong et al.

(10) Patent No.: US 11,379,371 B2
(45) Date of Patent: Jul. 5, 2022

(54) METHOD AND SYSTEM WITH IMPROVED MEMORY INPUT AND OUTPUT SPEED

(71) Applicants: RESEARCH & BUSINESS FOUNDATION SUNGKYUNKWAN UNIVERSITY, Suwon-si (KR); HIGH PERFORMANCE COMPUTING RESEARCH CENTER, Suwon-si (KR)

(72) Inventors: Jinkyu Jeong, Suwon-si (KR); Gyusun Lee, Suwon-si (KR)

(73) Assignees: Research & Business Foundation Sungkyunkwan University, Suwon-si (KR); High Performance Computing Research Center, Suwon-si (KR)

( * ) Notice: Subject to any disclaimer, the term of this patent is extended or adjusted under 35 U.S.C. 154(b) by 45 days.

(21) Appl. No.: 17/088,854

(22) Filed: Nov. 4, 2020

(65) Prior Publication Data

US 2021/0141727 A1 May 13, 2021

(30) Foreign Application Priority Data

Nov. 7, 2019 (KR) .................. 10-2019-0142069

(51) Int. Cl.
*G06F 12/0831* (2016.01)
*G06F 12/0871* (2016.01)
*G06F 9/54* (2006.01)
*G06F 13/16* (2006.01)
*G06F 9/48* (2006.01)
*G06F 12/02* (2006.01)

(52) U.S. Cl.
CPC ........ *G06F 12/0835* (2013.01); *G06F 9/4812* (2013.01); *G06F 9/542* (2013.01); *G06F 12/0238* (2013.01); *G06F 12/0871* (2013.01); *G06F 13/1673* (2013.01)

(58) Field of Classification Search
CPC ...... G06F 3/061; G06F 3/0659; G06F 3/0679; G06F 2009/45579; G06F 3/0655; G06F 12/0835; G06F 9/4812; G06F 9/542; G06F 12/0238; G06F 12/0871; G06F 13/1673

See application file for complete search history.

(56) References Cited

FOREIGN PATENT DOCUMENTS

| JP | 2011-509469 A | 3/2011 |
| JP | 2015-194918 A | 11/2015 |

(Continued)

OTHER PUBLICATIONS

English translation of KR20180062247A. (Year: 2018).*

(Continued)

*Primary Examiner* — Charles Rones
*Assistant Examiner* — Hewy H Li
(74) *Attorney, Agent, or Firm* — NSIP Law (57) ABSTRACT

A data management system includes a data storage device, a buffer memory, and a controller. The buffer memory is configured to temporally store data read during a reading operation of the data storage device. The controller is configured to, after transmitting a data input/output (I/O) instruction to the data storage device upon an indication of a data reading request, allocate the buffer memory, register a buffer cache of the buffer memory, allocate a direct memory access (DMA) address for the buffer memory, and release the DMA address.

13 Claims, 5 Drawing Sheets

(56) References Cited

FOREIGN PATENT DOCUMENTS

KR     10-2013-0076973 A     7/2013
KR     20180062247 A   *   6/2018   ......... G06F 13/1673

OTHER PUBLICATIONS

Stratikopoulos, Athanasios, et al. "FastPath: towards wire-speed NVMe SSDs." 2018 28th International Conference on Field Programmable Logic and Applications (FPL). IEEE, 2018. (Year: 2018).*

Markuze, Alex, Adam Morrison, and Dan Tsafrir. "True IOMMU protection from DMA attacks: When copy is faster than zero copy." Proceedings of the Twenty-First International Conference on Architectural Support for Programming Languages and Operating Systems. 2016. (Year: 2016).*

Zhang, Jie, et al. "Nvmmu: A non-volatile memory management unit for heterogeneous gpu-ssd architectures." 2015 International Conference on Parallel Architecture and Compilation (PACT). IEEE, 2015. (Year: 2015).*

Korean Office Action dated Dec. 21, 2020 in counterpart Korean Patent Application No. 10-2019-0142069 (6 pages in Korean).

* cited by examiner

--Prior Art--

METHOD AND SYSTEM WITH IMPROVED MEMORY INPUT AND OUTPUT SPEED

CROSS-REFERENCE TO RELATED APPLICATIONS

This application claims the benefit under 35 USC 119(a) of Korean Patent Application No. 10-2019-0142069 filed on Nov. 7, 2019, in the Korean Intellectual Property Office, the entire disclosure of which is incorporated herein by reference for all purposes.

BACKGROUND

1. Field

The following description disclosure relates to a method and system with improved memory input and output speed in an operating system.

2. Description of the Related Art

In recent years, solid state drives (hereinafter, abbreviated as "SSD") are being used as a data storage device to replace hard disks.

An SSD device stores information using memory semiconductor and is configured to be compatible with an advanced technology attachment (ATA) to perform a similar operation with a hard disk drive. Since the SSD device does not have a mechanically moving part, typical problems of hard disk drives, such as a long seek time, a latency, a mechanical latency, and a failure rate may be significantly reduced.

A reading function of the data storage device, provided by the operating system, performs an operation in each layer while passing through input/output layers to finally transmit an input/output instruction of the data storage device. Further, when the input/output operation of the data storage device is completed, the input/output operation is completed by returning to the layer.

To be more specific, in the related art, when it is requested to read data, a buffer cache is searched, a buffer memory is allocated, a buffer cache of the buffer memory is registered, a layering process of a file system is performed, it enters a block input/output layer, a DMA address of the buffer memory is allocated, and an input/output request of the data storage device is processed in sequence. When a hardware input/output process ends, after receiving a notification through an interrupt, the DMA address of the buffer memory is released, and a processor which requests the input/output is awaken and a context is switched.

In this case, when the input/output speed of the data storage device is slow (for example, a hard disk), the overall input/output latency is not largely affected by software input/output stack, but in the case of the SSD, the software input/output stack may affect the overall performance. Therefore, there may be a problem in that the input/output speed of the SSD is lowered as compared with the specified performance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a data management system includes a data storage device, a buffer memory, and a controller. The buffer memory is configured to temporally store data read during a reading operation of the data storage device. The controller is configured to, after transmitting a data input/output (I/O) instruction to the data storage device upon an indication of a data reading request, allocate the buffer memory, register a buffer cache of the buffer memory, allocate a direct memory access (DMA) address for the buffer memory, and release the DMA address.

The controller may be further configured to allocate the buffer memory and the DMA address in advance of performing the data I/O operation.

The controller may be further configured to register the buffer cache and release the DMA address while performing the data I/O operation.

The controller may be further configured to search through the buffer cache when there is the data reading request.

The controller may be further configured to receive a notification through an interrupt when the data I/O operation is completed.

The controller may be further configured to switch a context to perform another task after receiving the notification.

In another general aspect, a data management method includes searching through a buffer cache upon an indication of a reading request, transmitting a data input/output (I/O) instruction, allocating a buffer memory and a direct memory access (DMA) address in advance of performing the data I/O operation, and registering a buffer cache of the buffer memory and releasing the DMA address of the buffer memory while performing the data I/O operation.

A notification may be received through an interrupt when the data I/O operation is completed.

A controller may be configured to switch a context upon receiving the notification.

A non-transitory computer-readable storage medium storing instructions that, when executed by one or more processors, may configure the one or more processors to perform the method.

In another general aspect, a data management system includes a data storage device, a buffer memory, and a controller. The buffer memory is configured to store data read during a reading operation of the data storage device. The controller is configured to, after transmitting a data input/output (I/O) instruction to the data storage device upon an indication of a data reading request and before switching a context of the controller, allocate the buffer memory, register a buffer cache of the buffer memory, allocate a direct memory access (DMA) address for the buffer memory, and release the DMA address.

The controller may be further configured to, before performing the data I/O operation, allocate the buffer memory and the DMA address.

The controller may be further configured to register the buffer cache and release the DMA address while performing the data I/O operation.

The controller may be further configured to search through the buffer cache when there is the data reading request.

The controller may be further configured to receive a notification through an interrupt when the data I/O operation is completed.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
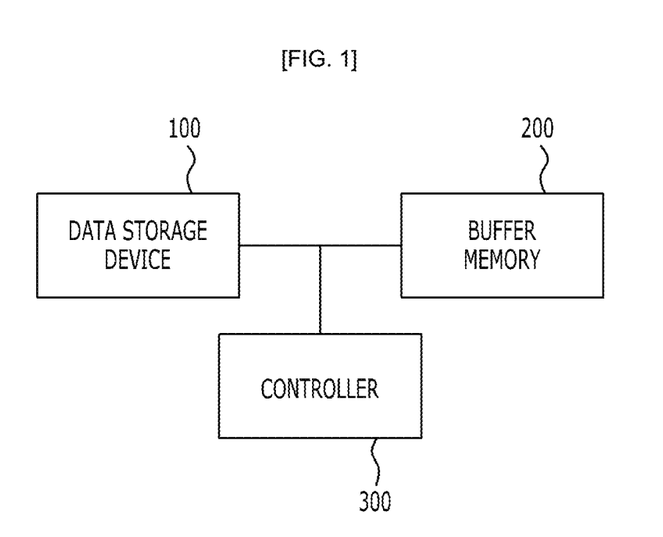
FIG. 1 is a block diagram illustrating an example of a data management system according to one or more embodiments.
Figure 2:
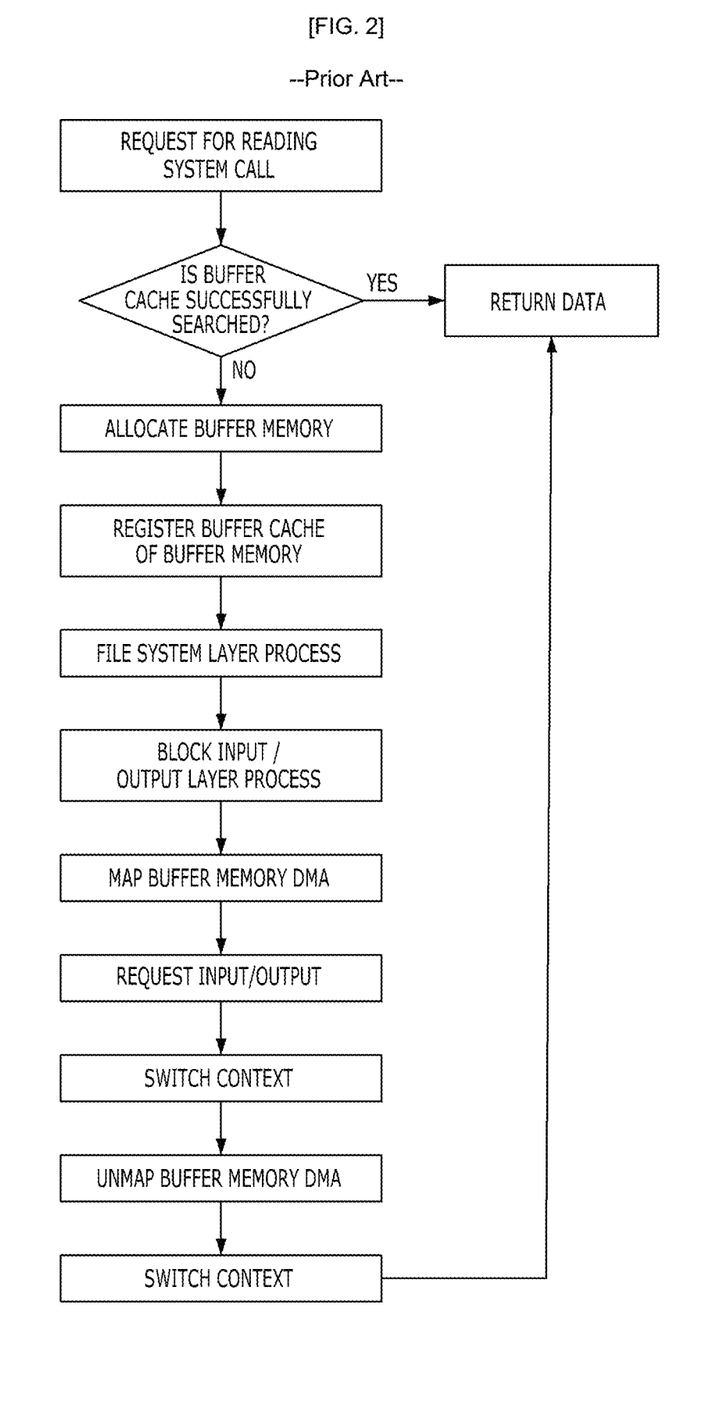
FIG. 2 is a flowchart illustrating a data management method in an operating system of the related art.
Figure 3:
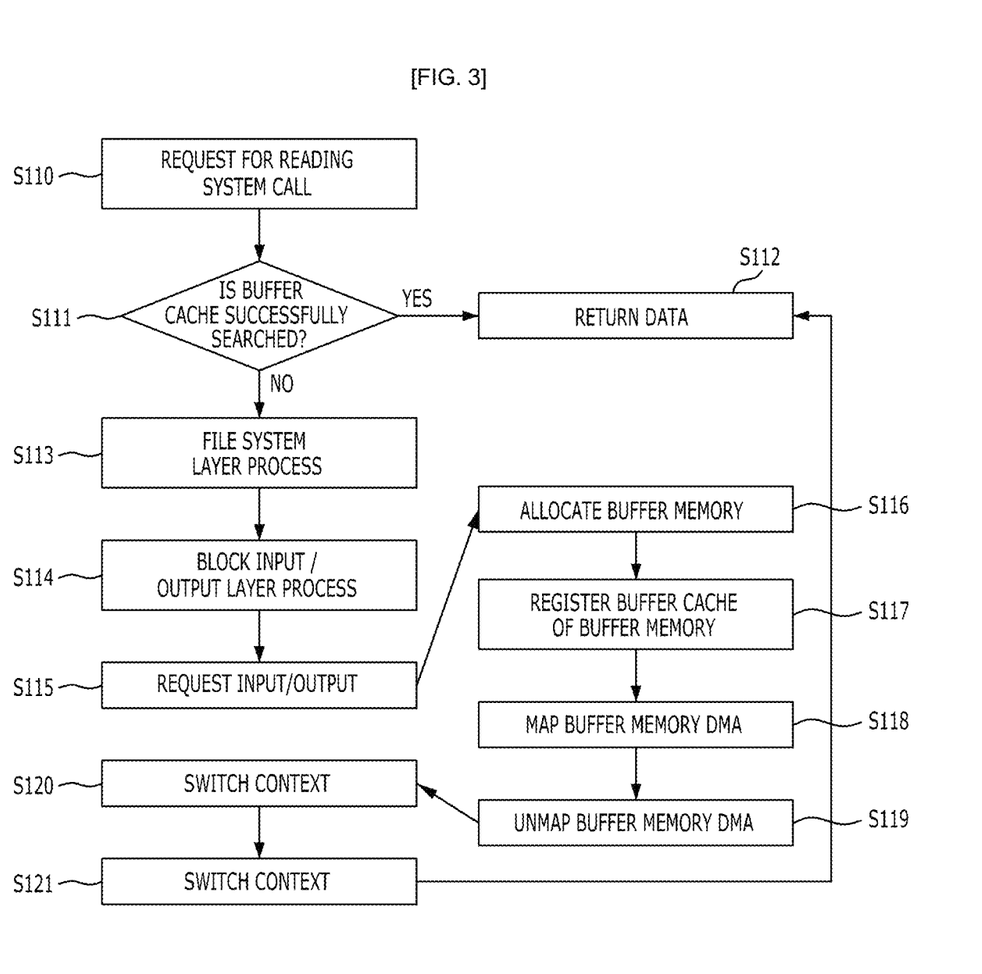
FIG. 3 is a flowchart illustrating an example of a data management method according to one or more embodiments.
Figure 4A:
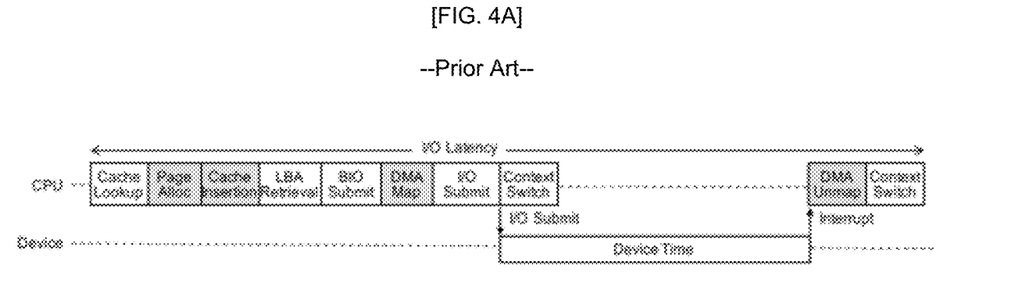
FIGS. 4A and 4B are views comparing a memory management method of the related art and an example of a data management method according to one or more embodiments.
Figure 4B:
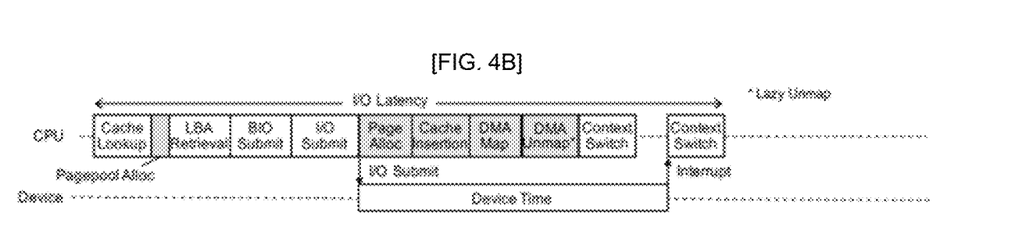
Figure 5A:
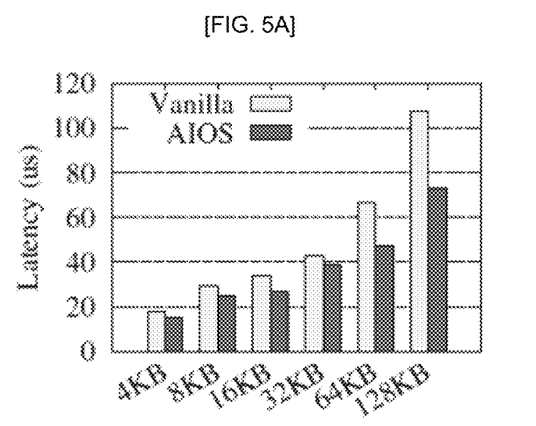
FIGS. 5A and 5B are graphs comparing an input/output latency of a data management system according to one or more embodiments with the related art.
Figure 5B:
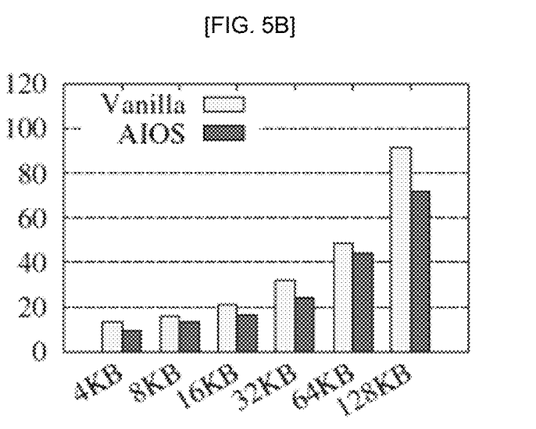

FIG. 1 is a block diagram illustrating an example of a data management system according to one or more embodiments. FIG. 2 is a flowchart illustrating a data management method in an operating system of the related art. FIG. 3 is a flowchart illustrating an example of a data management method according to one or more embodiments. FIGS. 4A and 4B are views comparing a data management method of the related art and a data management method according to one or more embodiments. FIGS. 5A and 5B are graphs comparing an input/output latency of a data management system according to one or more embodiments with what is conventional.

In FIG. 1, a data management system according to one or more embodiments includes a data storage device 100, a buffer memory 200, and a controller 300.

The data storage device 100 may include an area for storing data. The data storage device 100 may include an SSD. The data storage device 100 may include a non-volatile memory. The non-volatile memory may include a flash memory, an MROM, a PROM, and an FRAM.

Data, addresses, and instructions stored in the data storage device received from an external transmission may be temporally stored in the buffer memory 200 during a writing operation of the data storage device 100. Further, in the buffer memory 200, data detected by the data storage device 100 during a reading operation is temporally stored before being externally transmitted. Generally, the buffer memory 200 may be implemented by an SRAM or a DRAM, but is not limited thereto.

The controller 300 may serve to reduce the time for a reading process by performing an input/output (I/O) preparing process (software operation) during a process of passing through an I/O layer in the reading function of the data storage device 100 asynchronously with a reading I/O (a hardware operation of the data storage device) time. The controller 300 may be a partial component of the operating system.

Conventionally, a software operation and a hardware operation are sequentially performed so that a latency of the I/O time occurs. In contrast, according to one or more embodiments, the software operation and the hardware operation are controlled to be performed in parallel to effectively reduce the latency of the I/O time.

The controller 300 may transmit an I/O instruction to the data storage device upon a data reading request. The controller 300 is configured to allocate a buffer memory, register a buffer cache of the buffer memory, allocate a direct memory access (DMA) address, and release the DMA address after transmitting the I/O instruction.

Conventionally, before transmitting the I/O instruction, operations of allocating a buffer memory, registering a buffer cache of the buffer memory, allocating a DMA address, and releasing the DMA address are performed.

In contrast, according to one or more embodiments, after transmitting the I/O instruction to the data storage device 100, operations of allocating a buffer memory, registering a buffer cache of the buffer memory, allocating a DMA address, and releasing the DMA address are performed to reduce the I/O latency.

The controller 300 allocates the buffer memory and the DMA address in advance before performing the data I/O operation. By doing this, the buffer memory which is allocated in advance may be effectively used in the I/O layer.

In the buffer memory allocating operation, the buffer memory is allocated in advance to be managed with a linked list and a DMA address for each buffer memory is also allocated in advance.

The controller 300 may be configured to register the buffer cache of the buffer memory and release the DMA address of the buffer memory while performing the data I/O operation.

That is, the operations of allocating a buffer memory, registering a buffer cache of the buffer memory, allocating a DMA address, and releasing the DMA address are performed during the I/O operation so that it is not tallied in the overall reading I/O latency.

The controller 300 is configured to search through a buffer cache when there is the data reading request. In an example, if the buffer cache is searched, data is returned and if the buffer cache is not searched, the data I/O operation is performed.

The controller 300 may be configured to receive a notification through an interrupt when the data I/O operation is completed. When the notification is received through the interrupt, the controller 300 may be configured to switch a context to perform another task.

Hereinafter, a data management method of the present disclosure will be described in more detail with reference to FIGS. 2 and 3, by comparing the data management method of the related art.

In FIG. 2, a reading I/O process of an operating system of the related art synchronously performs a series of processes of requesting reading—allocating a buffer memory and registering a cache, passing through a file system and a block layer, allocating a DMA address of a buffer memory, and requesting I/O in a device driver.

In FIG. 3, in the reading I/O process according to the present disclosure, when there is a reading request, the cache is searched as the same manner and when the cache searching fails, the I/O requesting process is immediately performed without performing a process of allocating a buffer memory and a registering a cache of the related art. Even though not illustrated in the drawing, a process of receiving a buffer memory which has been allocated in advance is included.

The context is switched to wait until the I/O is completed in the data storage device after the I/O request and processes to be asynchronously performed are performed before switching the context so that the task may be performed in parallel to the data storage device. That is, the reading I/O process of the related art includes a plurality of tasks, but some of the tasks can be asynchronously performed with the I/O operation in the data storage device. Therefore, according to the present disclosure, one of the differences from the data management method of the related art is that the corresponding tasks are removed from a critical path to be asynchronously (in parallel) performed with the I/O operation in the data storage device.

Specifically, according to the present disclosure, processes of allocating (charging) a buffer memory, registering a buffer cache, allocating a DMA address of the allocated buffer memory, and releasing a DMA address of a buffer memory which has been already used are removed from a critical path to be asynchronously performed. That is, the buffer memory is allocated in advance and the DMA address is also allocated in advance so that the processes may be removed from the reading I/O path.

Accordingly, the above-described four processes are asynchronously performed with the I/O process in the data storage device so that the reading I/O critical path is shortened. Therefore, the reading I/O latency is shortened and the performance is improved.

As illustrated in FIG. 3, the data management method according to one or more embodiments include an operation S110 of searching for a buffer cache when there is a reading request, an operation S115 of transmitting a data I/O instruction, an operation S116 of allocating a buffer memory in advance, an operation S117 of registering the buffer cache of the buffer memory while performing the data I/O operation, an operation S118 of allocating the DMA address in advance, and an operation S119 of releasing the DMA address of the buffer memory.

First, when there is a reading request S110, the operation S111 of searching for a buffer cache may be performed.

When the buffer cache is successfully searched, an operation S112 of returning data may be performed. Alternatively, when the buffer cache is not successfully searched, the operation S115 of transmitting an I/O instruction may be performed.

Here, before the process of transmitting an I/O instruction, a file system layer process S113 and a block I/O layer process S114 may be further included. The file system layer and the block I/O layer may generally have a broadly known layer and the I/O request may be sequentially performed in accordance with the operations of each layer.

Here, a series of operations for a buffer memory may be asynchronously performed. The operations may perform the operation S116 of allocating a buffer memory, the operation S117 of registering a buffer cache of a buffer memory, the operation S118 of allocating a DMA address of a buffer memory, and the operation S119 of releasing a DMA address of the buffer memory.

Among the series of operations for the buffer memory, the operation S116 of allocating a buffer memory and the operation S118 of allocating a DMA address of a buffer memory may be performed before performing the data I/O operation.

Among the series of operations for the buffer memory, the operation S117 of registering a buffer cache of a buffer memory and the operation S119 of releasing a DMA address of the buffer memory may be performed while performing the data I/O operation.

As described above, in the data management method according to one or more embodiments, the series of operations of the buffer memory may be performed in parallel while performing the I/O operation so that the reading I/O latency may be effectively reduced.

When the data I/O operation is completed, after the operation of receiving a notification through the interrupt, the operation S120 of switching a context is performed. Thereafter, an operation S121 of switching a context to return the data is performed to complete the data management method.

FIG. 4A is a view explaining a synchronous process of the related art and FIG. 4B is a view explaining an example of an asynchronous process according to the present disclosure. In FIG. 4A, the reading I/O process of the related art includes operations of searching for a buffer cache (cache look-up), allocating a buffer cache (page allocate), registering the buffer cache (cache insertion), passing through a file system and a block layer (LBA retrieval and BIO submit), allocating buffer memory DMA address (DMA map), and requesting I/O (I/O submit) and after completing the I/O operation in the data storage device, the operation of releasing the DMA address of the buffer memory (DMA unmap) is performed. In FIG. 4B, the operations are performed in parallel with the I/O operation in the data storage device. The operations in gray can be asynchronously performed with the I/O operation in the data storage device. Further, an operation of taking a buffer memory from the buffer memory which has been allocated in advance (page pool allocate) is included.

As illustrated in FIGS. 5A and 5B, the system according to the present disclosure is applied to high performance SSDs (zSSD and optane SSD) to measure a performance. In the graph, "Vanilla" indicates a result in a default kernel and "Asynchronous I/O stack (AIOS)" indicates a result obtained by applying a technique proposed by the present disclosure. In order to measure the performance, a flexible I/O tester (FIO) benchmark is used and as depicted in the figures, the performance varies depending on the block size in a single thread environment. As the block size is increased, the degree of reduction of the absolute latency is increased, and the overall latency is effectively reduced.

The data storage device, buffer memory, controller, data storage device 100, buffer memory 200, and controller 300 in FIGS. 1, 3, and 4B-5B that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1, 3, and 4B-5B that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A data management system, comprising:
    a data storage device;
    a buffer memory configured to temporally store data read during a reading operation of the data storage device; and
    a controller configured to, after transmitting a data input/output (I/O) instruction to the data storage device upon an indication of a data reading request,
    allocate the buffer memory and a first direct memory access (DMA) address for the buffer memory in advance of performing a data input/output (I/O) operation, and
    register a buffer cache of the buffer memory and release a second DMA address of the buffer memory which has already been used while performing the data I/O operation.

2. The data management system of claim 1, wherein the controller is further configured to search through the buffer cache when there is the data reading request.

3. The data management system of claim 1, wherein the controller is further configured to receive a notification through an interrupt when the data I/O operation is completed.

4. The data management system of claim 3, wherein the controller is further configured to switch a context to perform another task after receiving the notification.

5. A data management method, comprising:
    searching through a buffer cache upon an indication of a reading request;
    transmitting a data input/output (I/O) instruction;
    allocating a buffer memory and a first direct memory access (DMA) address in advance of performing a data input/output (I/O) operation; and
    registering a buffer cache of the buffer memory and releasing a second DMA address of the buffer memory which has already been used while performing the data I/O operation.

6. The data management method of claim 5, wherein a notification is received through an interrupt when the data I/O operation is completed.

7. The data management method of claim 6, wherein a controller is configured to switch a context upon receiving the notification.

8. A non-transitory computer-readable storage medium storing instructions that, when executed by one or more processors, configure the one or more processors to perform the method of claim 5.

9. A data management system, comprising:
    a data storage device;
    a buffer memory configured to store data read during a reading operation of the data storage device; and
    a controller configured to, after transmitting a data input/output (I/O) instruction to the data storage device upon an indication of a data reading request and before switching a context of the controller, allocate the buffer memory, register a buffer cache of the buffer memory, allocate a first direct memory access (DMA) address for the buffer memory, and release a second DMA address of the buffer memory which has already been used.

10. The data management system of claim 9, wherein the controller is further configured to, before performing a data input/output (I/O) operation, allocate the buffer memory and the first DMA address.

11. The data management system of claim 10, wherein the controller is further configured to register the buffer cache and release the second DMA address while performing the data I/O operation.

12. The data management system of claim 9, wherein the controller is further configured to search through the buffer cache when there is the data reading request.

13. The data management system of claim 9, wherein the controller is further configured to receive a notification through an interrupt when the data I/O operation is completed.

* * * * *